US012724393B2

(12) United States Patent
Kobayashi et al.

(10) Patent No.: US 12,724,393 B2
(45) Date of Patent: Sep. 1, 2026

(54) DEVICE, SYSTEM, AND METHOD FOR CONTROLLING STATE QUANTITIES IN PLANTS

(71) Applicant: Yokogawa Electric Corporation, Tokyo (JP)

(72) Inventors: Ryo Kobayashi, Tokyo (JP); Takeshi Ohno, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 362 days.

(21) Appl. No.: 18/222,128

(22) Filed: Jul. 14, 2023

(65) Prior Publication Data

US 2024/0027984 A1 Jan. 25, 2024

(30) Foreign Application Priority Data

Jul. 21, 2022 (JP) ................................ 2022-116530

(51) Int. Cl.
*G05B 19/048* (2006.01)
*H04L 67/12* (2022.01)

(52) U.S. Cl.
CPC ............ *G05B 19/048* (2013.01); *H04L 67/12* (2013.01)

(58) Field of Classification Search
CPC .... G05B 19/0425; G05B 19/048; H04L 67/12
See application file for complete search history.

(56) References Cited

U.S. PATENT DOCUMENTS 9,940,285 B2 * 4/2018 Alley .................. G05B 19/054
2014/0047137 A1 * 2/2014 Mathason ........... G05B 19/054 710/33

(Continued)

FOREIGN PATENT DOCUMENTS

JP 2021124907 A 8/2021
JP 2021-157391 A 10/2021
WO 2022019106 A1 1/2022

OTHER PUBLICATIONS

Chinese Office Action (CNOA) dated Apr. 27, 2026 for Chinese Patent Application No. 202310894166.1; English machine translation.

*Primary Examiner* — Vincent H Tran
(74) *Attorney, Agent, or Firm* — RANKIN, HILL & CLARK LLP

(57) ABSTRACT

A device includes a receiving unit, a filtering unit, an abnormality detecting unit, and an output unit. The receiving unit receives an I/O output request that includes an operational output for an I/O output device to operate a plant, and that is transmitted from plural control units through a network. The filtering unit performs filtering in which an I/O output request from a proper control unit out of the received I/O output requests is selected and output. The abnormality detecting unit detects an abnormality of the I/O output request. The output unit transmits, when the abnormality is detected, an alternate I/O output request, which is a request including an alternate operational output, to an I/O output device corresponding to the I/O output request, and that outputs, when the abnormality is not detected, the I/O output request output from the filtering unit to an I/O output device corresponding to the I/O output request.

7 Claims, 12 Drawing Sheets

(56) References Cited

U.S. PATENT DOCUMENTS

| | | | | |
|---|---|---|---|---|
| 2015/0154136 | A1* | 6/2015 | Markovic | G06F 21/44 710/317 |
| 2017/0147367 | A1* | 5/2017 | Alley | G05B 19/054 |
| 2018/0373229 | A1* | 12/2018 | Naidoo | G05B 23/0221 |
| 2019/0104633 | A1* | 4/2019 | Ross | G05B 19/05 |
| 2020/0334173 | A1* | 10/2020 | Hughes | G05B 19/0425 |
| 2021/0302932 | A1* | 9/2021 | Hamers | G05B 19/0425 |
| 2021/0390070 | A1* | 12/2021 | White, Jr. | G06F 13/385 |
| 2023/0098444 | A1* | 3/2023 | Onishi | G05B 19/042 710/6 |

* cited by examiner

FIG.3A

| I/O OUTPUT DEVICE NUMBER | I/O TYPE | ALTERNATE OPERATIONAL OUTPUT | CONTROL UNIT ID |
|---|---|---|---|
| 1 | ANALOG | 0 | 172.18.32.1 |
| 2 | DIGITAL | False | 172.18.32.2 |
| 3 | ANALOG | 50 | 172.18.32.3 |

FIG.3B

| CONTROL UNIT ID | REQUEST WAITING TIME |
|---|---|
| 172.18.32.1 | 1000 |
| 172.18.32.2 | 2000 |
| 172.18.32.3 | 2000 |

FIG.7A

| CONTROL UNIT ID | CONTROL-UNIT GROUP ID |
|---|---|
| 172.18.32.1 (CONTROL UNIT 30) | 1 |
| 172.18.32.2(CONTROL UNIT 31) | 1 |
| 172.18.32.3 (FOR SINGLE CONFIGURATION) | 2 |

FIG.7B

| I/O OUTPUT-DEVICE NUMBER | I/O TYPE | ALTERNATE OPERATIONAL OUTPUT | CONTROL-UNIT GROUP ID |
|---|---|---|---|
| 1 | ANALOG | 0 | 1 |
| 2 | DIGITAL | False | 1 |
| 3 | ANALOG | 50 | 2 |

FIG.7C

| CONTROL-UNIT GROUP ID | GROUP REQUEST CYCLE | ALLOWABLE ELAPSED TIME | REQUEST WAITING TIME |
|---|---|---|---|
| 1 | 500 | 250 | 1000 |
| 2 | 1000 | 500 | 2000 |
| 3 | 250 | 125 | 500 |

DEVICE, SYSTEM, AND METHOD FOR CONTROLLING STATE QUANTITIES IN PLANTS

CROSS-REFERENCE TO RELATED APPLICATION(S)

The present application claims priority to and incorporates by reference the entire contents of Japanese Patent Application No. 2022-116530 filed in Japan on Jul. 21, 2022.

FIELD

The present disclosure relates to a device, a system, and a method.

BACKGROUND

A process control system controls various state quantities (for example, pressure, temperature, flow rate, and the like) in industrial processes in plants, factories, and the like (hereinafter, simply "plant" when these are collectively referred to), and performs advance automated operation (for example, JP-A-2021-157391).

A conventional process control system is composed around a dedicated controller of vendor proprietary specifications. This dedicated controller acquires state quantities through an I/O interface unit based on I/O input values from plural sensors (a flowmeter, a thermometer, and the like). The I/O interface unit is positioned between a control unit such as a dedicated controller, and an I/O input device such as a sensor, or an I/O output device such as an actuator, and is to provide a function necessary for exchanging I/O data therebetween. Next, the dedicated controller calculates a control variable of the I/O output device (actuator of a valve, or the like) according to the state quantity. Furthermore, the dedicated controller gives an I/O output value according to this control variable to the I/O output device through the I/O interface unit, to operate it. By these three functions of the dedicated controller, various kinds of state quantities described above are controlled.

However, in an open process control system in recent years, instead of a dedicated controller, a general-purpose controller that is a general-purpose device (for example, PC, workstation, or the like) in which a standard control function (for example, control function compliant with IEC61131-3, or the like) is installed is proposed. Systems in which this general-purpose controller and the I/O interface unit are connected by a standard network (for example, OPC-UA or the like) have been increasing. The background for that includes that users of the process control system desire a system environment in which the initial cost of a system is suppressed, and implementation of a digital transformation (DX) technology is easy, and that the users are trying to achieve a multi-vendor environment in which the control function and the I/O interface unit are connected through an open network by requesting the vendors to achieve that goal. Accordingly, in the process control system of a multi-vendor environment, the I/O interface unit is required to satisfy I/O output requests from multiple general-purpose controllers.

The present disclosure proposes a device, a system, and a method of an I/O output device that is capable of supporting multiple control units.

SUMMARY

It is an object of the present invention to at least partially solve the problems in the conventional technology.

According to one aspect of embodiments, a device includes, a receiving unit that receives an I/O output request including an operational output for an I/O output device to operate a plant, the I/O output request transmitted from a plurality of control units through a network, a filtering unit that performs filtering in which an I/O output request from a proper control unit out of the received I/O output requests is selected and output, an abnormality detecting unit that detects an abnormality of the I/O output request, and an output unit that transmits, when the abnormality is detected, an alternate I/O output request, which is a request including an alternate operational output, to an I/O output device corresponding to the I/O output request, and that outputs, when the abnormality is not detected, the I/O output request output from the filtering unit to an I/O output device corresponding to the I/O output request.

According to one aspect of embodiments, a system includes, a plurality of control units that transmit an I/O output request that is a request including an operational output for an I/O output device to operate a plant, a receiving unit that receives the I/O output request through a network, a filtering unit that performs filtering in which an I/O output request from a proper control unit out of the received I/O output requests is selected and output, an abnormality detecting unit that detects an abnormality of the I/O output request, and an output unit that transmits, when the abnormality is detected, an alternate I/O output request, which is a request including an alternate operational output, to an I/O output device corresponding to the I/O output request, and that outputs, when the abnormality is not detected, the I/O output request output from the filtering unit to an I/O output device corresponding to the I/O output request.

According to one aspect of embodiments, a method includes, receiving an I/O output request including an operational output for an I/O output device to operate a plant, the I/O output request transmitted from a plurality of control units through a network, performing filtering in which an I/O output request from a proper control unit out of the received I/O output requests is selected and output, detecting an abnormality of the I/O output request, and transmitting, when the abnormality is detected, an alternate I/O output request, which is a request including an alternate operational output, to an I/O output device corresponding to the I/O output request, and outputting, when the abnormality is not detected, the I/O output request subjected to the filtering to an I/O output device corresponding to the I/O output request.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3A is a diagram illustrating an example of I/O output information according to the first embodiment of the present disclosure;

FIG. 3B is a diagram illustrating an example of I/O output information according to the first embodiment of the present disclosure;

FIG. 7A is a diagram illustrating an example of control-unit group information according to the second embodiment of the present disclosure;

FIG. 7B is a diagram illustrating an example of control-unit group information according to the second embodiment of the present disclosure;

FIG. 7C is a diagram illustrating an example of control-unit group information according to the second embodiment of the present disclosure;

DESCRIPTION OF EMBODIMENTS

Hereinafter, embodiments of the present disclosure will be explained in detail based the drawings. The explanation will be given in following order. In the following respective embodiments, by assigning same reference signs to same components, duplicated explanation thereof will be omitted.

1. Conventional Configuration
2. First Embodiment
3. Second Embodiment
4. Third Embodiment
5. Fourth Embodiment
6. Fifth Embodiment

1. Conventional Configuration

Figure 1:
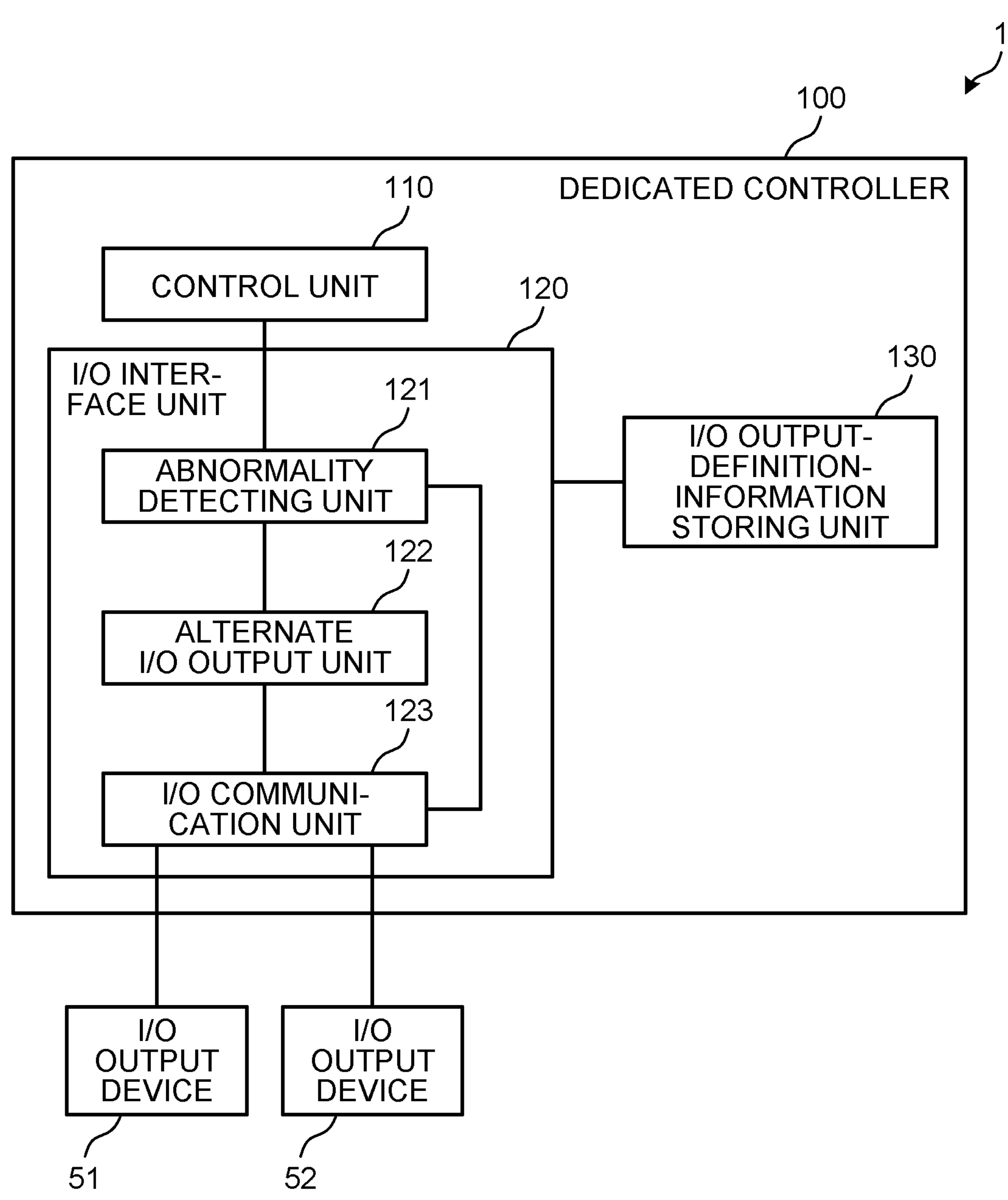
FIG. 1 is a diagram illustrating a configuration example of a conventional I/O interface unit.

FIG. 1 is a diagram illustrating a configuration example of a conventional I/O interface unit. The drawing is a diagram illustrating a configuration example of the dedicated controller described previously. A dedicated controller 100 includes a control unit 110, an I/O interface unit 120, and an I/O output-definition-information storing unit 130. In the drawing, I/O output devices 51 and 52 are also provided. These I/O output devices 51 and 52 are operating devices, such as an actuator and valve.

The control unit 110 is to perform a control function, and to generate I/O output information as a result of the control. This control unit 110 issues an I/O output request to the I/O interface unit 120 based on the generated I/O output information. The I/O output request is plural sets of an ID of an I/O output data point and its output value combined together. The I/O output request is issued for all of the I/O output devices that are to output. The I/O output request is output in constant cycles frequency (hereinafter, referred to as request cycle).

The I/O interface unit 120 includes an abnormality detecting unit 121, an alternate I/O output unit 122, and an I/O communication unit 123.

The abnormality detecting unit 121 monitors whether an I/O output request is received from the control unit 110 in synchronization with the request cycle. This request cycle is, for example, 1000 microseconds (ms). The abnormality detecting unit 121 sends the received I/O output request to the I/O communication unit 123. When an I/O output request from the control unit is not received even after waiting for request waiting time, the abnormality detecting unit 121 determines that the only control unit 110 that issues an I/O output request is in an abnormal state, and that the control unit 110 cannot output to all of IO output data points. In this case, the abnormality detecting unit 121 designates IDs of all of the I/O output data points defined in I/O output-definition information of the I/O output-definition-information storing unit 130, to call an alternate I/O output unit 122. The request waiting time can be set to an integral multiple of the request cycle. For example, it can be set to 4000 ms, which is quadruple of the request cycle. As for the monitoring method, for example, a monitoring system by periodically polling to check whether a buffer that receives a I/O output request from the control unit has been updated, or a system of notifying when it is not updated for predetermined time (for example, a watchdog timer or the like) can be used.

The alternate I/O output unit 122 is to set an output value forcibly to a safe value for a specified abnormal I/O output data point, to output it. This alternate I/O output unit 122 sends, to the I/O communication unit 123, an I/O output request that is generated by setting a safe value of the I/O output-definition information for all of the I/O output data points in which an abnormality is detected by the abnormality detecting unit 121.

The I/O communication unit 123 is to perform signal conversion on output data of the received I/O output request for each I/O type, to output to the I/O output device. Moreover, at the time of input from the I/O input device, the I/O communication unit 123 converts an input signal into input data for each I/O type, to send it to the control unit 110.

The I/O output-definition information is information necessary for respective components to operate. This I/O output-definition information is composed of information of the control unit 110 and information of each I/O output data point. The safe value when an abnormality occurs is registered for each of the I/O output data points. The I/O output-definition information is arranged in a storing unit, such as a memory region that can be referred by the respective components before the respective components operate, and can be changed dynamically even when the respective components are operating.

Operation of the dedicated controller 100 in the drawing will be explained. First, the control unit 110 sends an I/O output request to the abnormality detecting unit 121 every request cycle. The abnormality detecting unit 121 operates in the request cycle, and operates in constant cycles even when the control unit 110 stops, or when the control unit 110 cannot send a I/O output request. Furthermore, the abnormality detecting unit 121 checks whether an I/O output request to be received from the control unit 110 is present. When an I/O output request is present, the abnormality detecting unit 121 relays the I/O output request and calls the I/O communication unit. On the other hand, the abnormality detecting unit 121 checks whether it has been waiting for an I/O output request for the request waiting time or longer, and specifies IDs of all of the I/O output data points when it has been waiting for the request waiting time or longer, and calls the alternate I/O output unit 122.

The alternate I/O output unit 122 operates when it is called by the abnormality detecting unit 121. The alternate I/O output unit 122 generates an I/O output request of the specified I/O output data point, and calls the I/O communication unit 123, specifying the I/O output request.

The I/O communication unit 123 operates when it is called by the abnormality detecting unit 121 and the alternate I/O output unit 122, and transmits the I/O output request to the I/O output devices 51 and 52.

The I/O output devices 51 and 52 operate in response to reception of the I/O output request from the I/O communication unit 123.

Problems of Conventional Technique

For the open plant control system, high level of safety and reliability equivalent to conventional plant control systems are required. Therefore, a network-compatible I/O interface device receives an I/O output request from control units that are present on a network separately from the network-compatible I/O interface device. Accordingly, the network-compatible I/O interface device need to output the I/O output request from the plural control units on the network without duplication. This is because there is a case in which the network-compatible I/O interface device receives I/O output requests from different control units for the same I/O. The cause of this duplication is mainly a human error in engineering of the control unit.

Moreover, the network-compatible I/O interface device needs to monitor the I/O output request from the plural control units on the network, and to perform fallback for each I/O. Fallback signifies a function of forcibly setting an output value of I/O to a safe value to output it at the event of abnormality. For example, when an I/O output request cannot be transmitted because of an abnormality in the control unit of the dedicated or general-purpose controller, or in the network communication function of the network-compatible I/O interface device, an output value to I/O is set to a safe value to be output. By this fallback, safe plant operation can be maintained.

2. First Embodiment

Configuration of Control System

Figure 2:
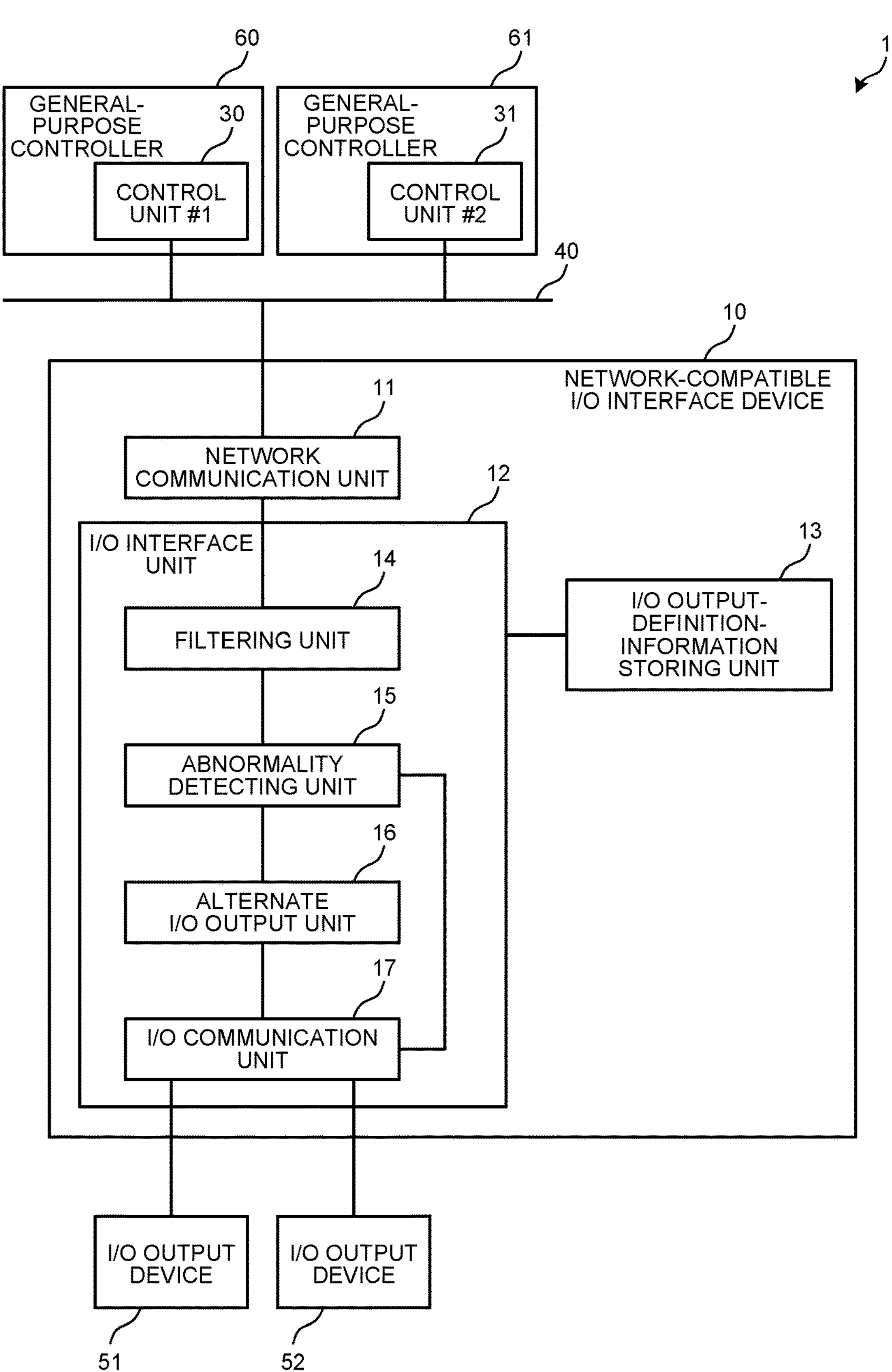
FIG. 2 is a diagram illustrating a configuration example of a control system according to a first embodiment of the present disclosure.

FIG. 2 is a diagram illustrating a configuration example of a control system according to a first embodiment of the present disclosure. The drawing is a block diagram illustrating a configuration example of a control system 1. The control system 1 includes a general-purpose controllers 60 and 61, a standard network 40, a network-compatible I/O interface device 10, the I/O output device 51, and the I/O output device 52.

The general-purpose controllers 60 and 61 are general-purpose devices having a control function. For example, a PC, a work station, or the like corresponds to the general-purpose controllers 60 and 61. A general-purpose controller 60 includes a control unit 30. The general-purpose controller 61 includes a control unit 31.

The control units 30 and 31 are included in a process control system in a plant or the like. These control units 30 and 31 perform control of the I/O output devices 51 and 52 installed in a plant. Specifically, they calculate an operational output according to an input from an I/O input device corresponding to an input device, such as a sensor, according to a control logic, and output to the I/O output device 51 corresponding to the operating device, and the like. Furthermore, the control units 30 and 31 are connected to the standard network 40, and output an I/O output request including the operational output through this standard network 40. The I/O output request can be configured to further include a control unit ID, which is an identifier of the control unit 30 itself, or the like, and an I/O output-device number to identify the I/O output device 51 or the like subject to operational output.

The I/O output devices 51 and 52 are each an operating device that performs operation of a plant such as an actuator and a valve. On the other hand, the I/O input device corresponding to the input device, such as a sensor, inputs an input value, such as a value detected by a sensor, to the control unit 30 or the like. Moreover, the I/O output device 51 or the like corresponding to the operating device operates a target of control based on the operational output (including an output value which is a result calculated by the control unit 30 or the like) from the control unit 30 or the like.

The network-compatible I/O interface device 10 includes a network communication unit 11, an I/O interface unit 12, and an I/O output-definition-information storing unit 13. The network communication unit 11 may be configured not dependent on a protocol, but may be of a one-to-one client-server communication, or one-to-many publisher-subscriber communication.

The network communication unit 11 is to perform communication with the standard network 40. The network communication unit 11 in the drawing receives an I/O output request from the control unit 30 or the like, and outputs it to a filtering unit 14 of the I/O interface unit 12. Furthermore, the network communication unit 11 transmits an input value from the I/O input device corresponding to the input device to the control unit 30 or the like through the standard network 40. The network communication unit 11 is one example of a receiving unit.

The I/O output-definition-information storing unit 13 is to store I/O output information. Details of the I/O output information will be described later.

The I/O interface unit 12 is arranged between the control units 30 and 31, and the I/O output devices 51 and 52 to provide a function necessary for two-way data exchange. The I/O interface unit 12 includes a filtering unit 14, an abnormality detecting unit 15, an alternate I/O output unit 16, and an I/O communication unit 17.

In the control system 1 in the drawing, plural control units (control units 30 and 31) operate through the standard network 40. To support this, in the I/O interface unit 12, the filtering unit 14 to avoid duplication of the I/O request is added. Moreover, instead of the abnormality detecting unit 121 in FIG. 1, the abnormality detecting unit 15 that performs abnormality detection of I/O output request for each of the plural control units (control units 30 and 31) is arranged.

While the number of the control unit is one in the conventional technique (control system 1 in FIG. 1), in the present invention, I/O output requests from plural control units (control units 30 and 31) are monitored. Furthermore, while the abnormality detecting unit 121 of the control system 1 in FIG. 1 operates, synchronizing with the same cycle as the control unit, the abnormality detecting unit 15 in the drawing operates in a unique cycle independent of the control unit (hereinafter, referred to as I/O output cycle).

Although not illustrated in the drawing, the network communication unit 11 converts an input signal from the I/O input device into input data for each I/O type, and transmits it to the control unit needing it. There is no problem in transmitting this input data to plural control units at the same time.

The filtering unit 14 is to perform filtering in which an I/O output request from a proper control unit is selected and output from among I/O output requests that have been output from the network communication unit 11. This filtering is performed based on the I/O output information stored in the I/O output-definition-information storing unit 13.

The abnormality detecting unit 15 is to detect an abnormality of I/O output request that is output from the filtering unit 14. This abnormality detecting unit 15 can detect an abnormality, for example, when the control unit 30 or the like does not transmit an I/O output request within the request waiting time, which is a predetermined period. The request waiting time is information included in the I/O output information described above.

Moreover, the abnormality detecting unit 15 outputs an alternate I/O output request to the I/O output device 51 or the like when an abnormality of I/O output request is detected. This can be performed by calling the alternate I/O output unit 16 by the abnormality detecting unit 15. This alternate I/O output request is information including an alternate operational output included in the I/O output information described above. The abnormality detecting unit 15 monitors I/O output requests from the plural control units 30 and the like, unlike the abnormality detecting unit 121 in FIG. 1.

The I/O communication unit 17 is to perform signal conversion on data of the I/O output request and the alternate I/O output request output from the abnormality detecting unit 15 for each of the I/O output devices 51 and the like, to output.

I/O Output Information

FIGS. 3A and 3B are diagrams illustrating an example of I/O output information according to the first embodiment of the present disclosure. The drawing illustrates three types of I/O output information.

FIG. 3A is a diagram illustrating a correspondence among an I/O output device number, an I/O type, an alternate operational output, and a control unit ID out of the I/O output information. "I/O OUTPUT DEVICE NUMBER" is a number to identify the I/O output device 51 and the like. To the I/O output devices 51 and 52, I/O output device numbers "1" and "2" can be assigned. "I/O TYPE" is to indicate a data format of an operational output of the I/O output device 51 and the like. "Analog" in the drawing signifies an analog signal, and "DIGITAL" signifies a digital signal. "ALTERNATE OPERATIONAL OUTPUT" signifies an alternate operational output. For this alternate operational output, a value in accordance with a format of data is used. "CONTROL UNIT ID" is to identify the control unit 30 and the like. The drawing illustrates an example of a case in which an IP address of the control unit 30 and the like is used as the control unit ID. To the control units 30 and 31 in FIG. 2, "172.18.32.1" and "172.18.32.2" can be assigned.

FIG. 3B is a diagram illustrating the request waiting time for each of the control units and the like out of the I/O output information. The request waiting time of "172.18.32.1", "172.18.32.2" and "172.18.32.3" is 1000 ms, 2000 ms, and 2000 ms, respectively. The request waiting time can be set for each of the control units, and is set to, for example, an integral multiple of the I/O output cycle, or the like.

Filtering Processing

Figure 4:
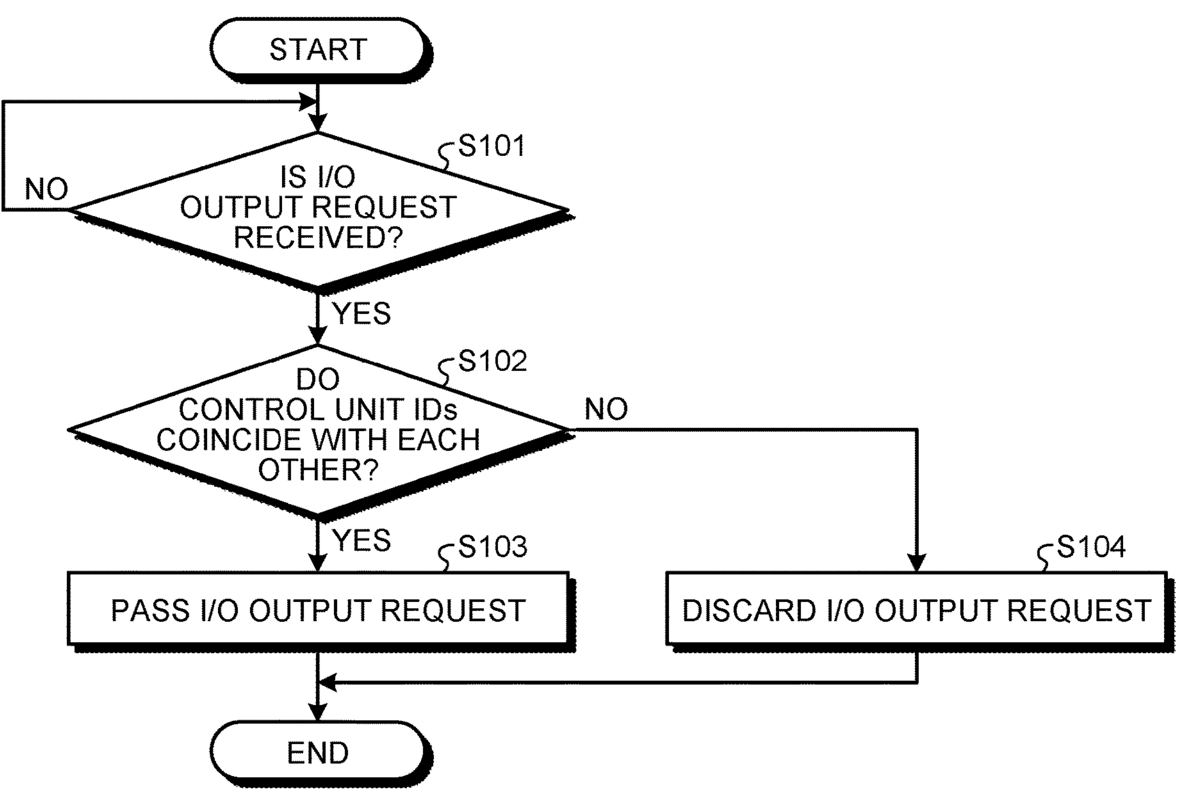
FIG. 4 is a diagram illustrating an example of a procedure of filtering processing according to the first embodiment of the present disclosure.

FIG. 4 is a diagram illustrating an example of a procedure of the filtering processing according to the first embodiment of the present disclosure. The drawing is a flowchart illustrating an example a procedure of processing in the filtering unit 14. First, the network communication unit 11 receives an I/O output request (step S101). The network communication unit 11 outputs the received I/O output request to the filtering unit 14. Next, the filtering unit 14 judges whether the control unit ID and the I/O output device number included in the I/O output request that is output from the network communication unit 11 coincides with the control unit ID and the I/O output device number registered in the I/O output information of the I/O output-definition-information storing unit 13 (step S102). This is achieved by the filtering unit 14 reading the I/O output information from the I/O output-definition-information storing unit 13 based on the I/O output device number included in the I/O output request, and comparing the control unit ID included in the read I/O output information and the control unit ID included in the I/O output request.

As a result of this judgment, when the control unit IDs coincide with each other (step S102: YES), the filtering unit 14 lets the I/O output request pass through (step S103). On the other hand, when the control unit IDs do not coincide with each other (step S102: NO), the filtering unit 14 discard the I/O output request (step S104).

Abnormality Detection Processing

Figure 5:
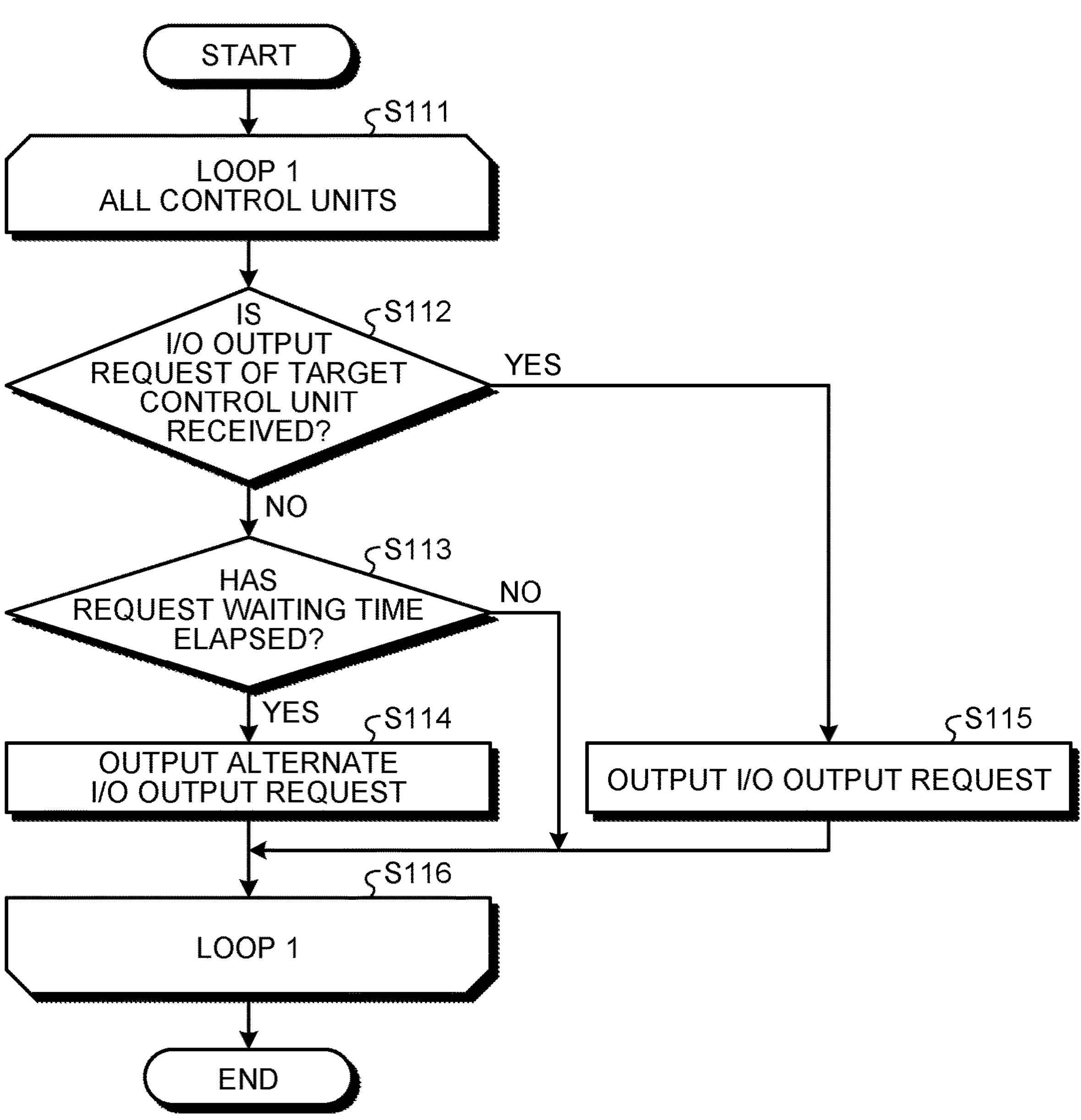
FIG. 5 is a diagram illustrating an example of a procedure of an abnormality detection processing according to the first embodiment of the present disclosure.

FIG. 5 is a diagram illustrating an example of a procedure of abnormality detection processing according to the first embodiment of the present disclosure. The drawing is a flowchart illustrating an example of a procedure of processing in the abnormality detecting unit 15. The abnormality detecting unit 15 performs a processing loop 1 (steps S111 to S116) of the abnormality detection processing. A termination condition of this processing loop 1 is to perform the abnormal detection processing for all of the control units. The abnormality detecting unit 15 selects one out of the control units 30 and the like, and judges whether an I/O output request is received from the target control unit, which is the selected control unit 30 and the like (step S112). As a result, when an I/O output request is received (step S112: YES), the abnormality detecting unit 15 outputs the received I/O output request to the I/O communication unit 17 (step S115), and proceeds to step S116.

At step S112, when an I/O output request of the target control unit is not received (step S112: NO), the abnormality detecting unit 15 judges whether the request waiting time of the target control unit has elapsed (step S113). As a result, when the request waiting time has not elapsed (step S113: NO), the abnormality detecting unit 15 proceeds to step S116.

On the other hand, at step S113, when the request waiting time has elapsed (step S113: YES), the abnormality detecting unit 15 outputs an alternate I/O output request including an alternate operational output read from the I/O output-definition-information storing unit 13 to the I/O communication unit 17 (step S114), and proceeds to step S116.

At step S116, when the abnormality detection processing has performed for all of the control units, the processing loop 1 is ended (step S116). Thereafter, the abnormality detecting unit 15 ends the processing.

As described above, the network-compatible I/O interface device 10 can remove an invalid I/O output request by performing filtering, and can transmit only a proper I/O output request to the I/O output device 51 and the like. Even when another control unit that controls the same I/O output device 51 and the like is connected through the standard network 40 by a human error or the like and an I/O output request is transmitted to the same I/O output device 51 and the like, an invalid I/O output request can be removed.

As described, the network-compatible I/O interface device 10 of the first embodiment of the present disclosure transmits only a proper I/O output request to the I/O output device 51 and the like by performing filtering. By providing the network-compatible I/O interface device 10 as described, control of the I/O output device 51 and the like by plural control units (control units 30 and 31) connected through the standard network 40 is enabled.

3. Second Embodiment

In a second embodiment of the present disclosure, the control system 1 that includes plural control units to provide redundancy is proposed. In an open plant control system also, a high level of reliability for failures of a control function or a network path is expected, similarly to the conventional plant control systems. The open plant control system needs to establish the reliability equivalent to the control function of the dedicated controller that have a redundant configuration. For this, redundancy for the control function of the general-purpose controller, and redundancy for a network path to the general-purpose controller are necessary.

The redundancy for the control function of the general-purpose controller corresponds to a system of transmitting an I/O output request even when the general-purpose controller goes down by a failure such as breakdown, by providing another general-purpose controller in which the same control function is in operation in substitution therefor.

The redundancy for the network path to the general-purpose controller corresponds to a system in which an I/O output request from another general-purpose controller through a different network path can be received even when communication is disabled with the network path to the network-compatible interface device from the general-purpose controller because of disconnection or the like. The independent network path includes, not only providing a network cable or a network device, but also providing a NIC card of the network-compatible I/O interface device for each connection of a general-purpose controller.

Configuration of Control System

Figure 6:
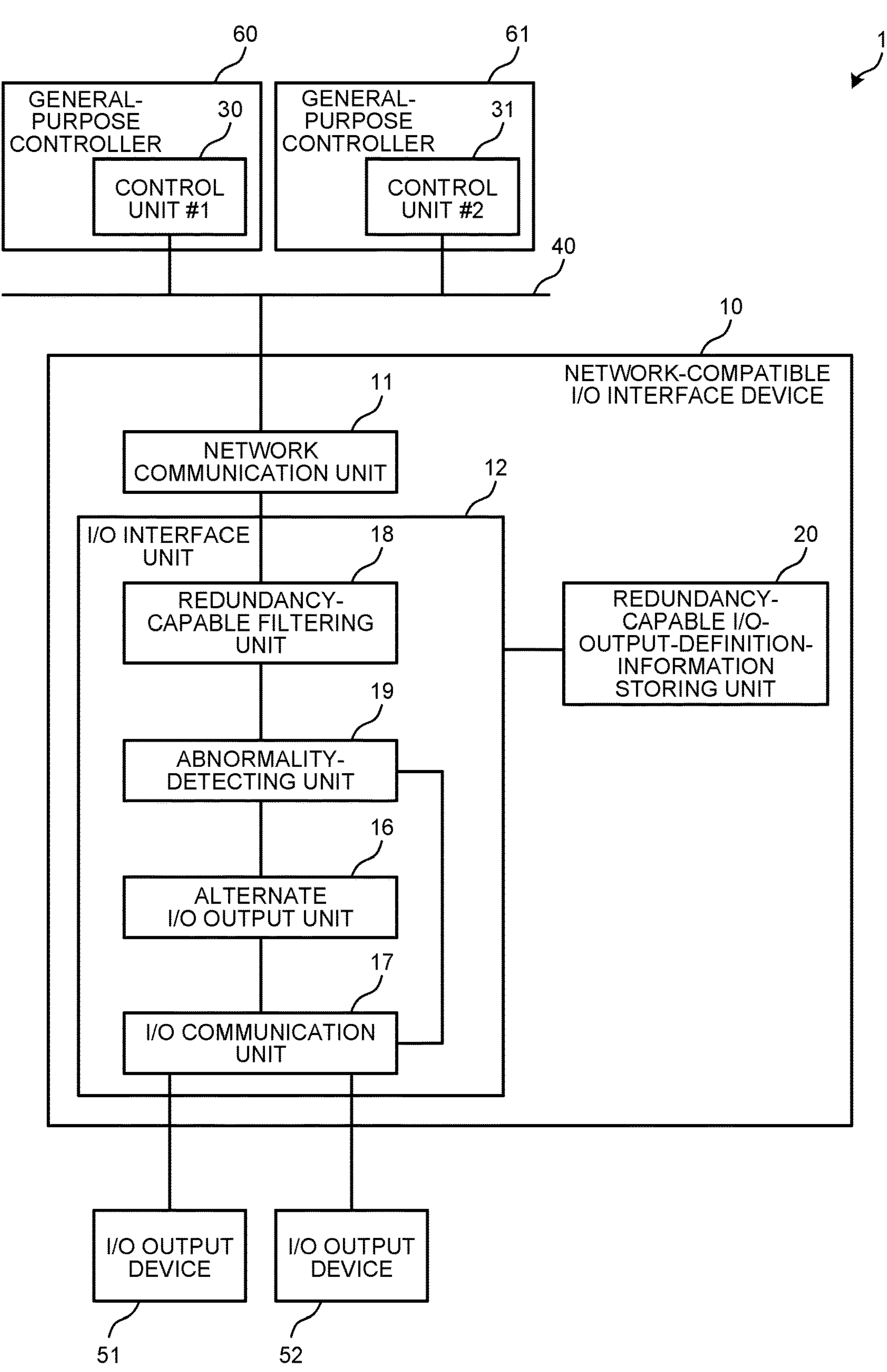
FIG. 6 is a diagram illustrating a configuration example of a control system according to a second embodiment of the present disclosure.

FIG. 6 is a diagram illustrating a configuration example of a control system according to a second embodiment of the present disclosure. The drawing is a block diagram illustrating a configuration example of the control system 1 similarly to FIG. 2. The network-compatible I/O interface device 10 in the drawing differs from the network-compatible I/O interface device 10 in FIG. 2 in a point that it includes a redundancy-capable I/O-output-definition-information storing unit 20, a redundancy-capable filtering unit 18, and an abnormality-detecting unit 19 in place of the I/O output-definition-information storing unit 13, the filtering unit 14, and the abnormality detecting unit 15. The abnormality-detecting unit 19 is configured to detect an abnormality for each control unit group.

Unlike the first embodiment, the control units 30 and 31 take a redundant configuration with duplication. In the control units 30 and 31, a processing content in a fixed cycle is same. Although not illustrated in the drawing, the network communication unit 11 converts an input signal from the I/O input device in to input data, to transmit it to the control units 30 and 31 simultaneously. Moreover, the control units 30 and 31 belong to the same control unit group described later, and perform a fixed-cycle operation of the same cycle starting from the same time. Therefore, the control units 30 and 31 can perform the fixed-cycle processing of the same content in synchronization with each other.

The redundancy-capable I/O-output-definition-information storing unit 20 is to store control-unit-group information. The redundancy-capable I/O-output-definition-information storing unit 20 outputs the stored control-unit-group information to the redundancy-capable filtering unit 18.

The control-unit-group information is a group including plural control units that transmit an I/O output request to the same I/O output device 51 or the like. In the control system 1 in the drawing, it is assumed that the control units 30 and 31 are included in the same control-unit group. Control units belonging to the same control-unit group transmit an I/O output request, synchronizing with a common request cycle (hereinafter, referred to as group request cycle).

The redundancy-capable filtering unit 18 performs filtering for each control-unit group. Specifically, the redundancy-capable filtering unit 18 performs second filtering in which an I/O output request is selected to be output based on the group request cycle of each control-unit group. This second filtering corresponds to filtering in which the first I/O output request is selected from among plural I/O output requests that includes the same operational output received in the group request cycle. The redundancy-capable filtering unit 18 is one example of a filtering unit.

Details of the second filtering will be explained. When the control units 30 and 31 and the standard network 40 are normal, an I/O output request of the same content is transmitted in every group request cycle, and is received by the network communication unit 11. In this case, the redundancy-capable filtering unit 18 outputs the first one out of the I/O output requests transmitted respectively by the control units 30 and 31 to the abnormality-detecting unit 19, and discard an I/O output request that is not the first one.

Figure 8:
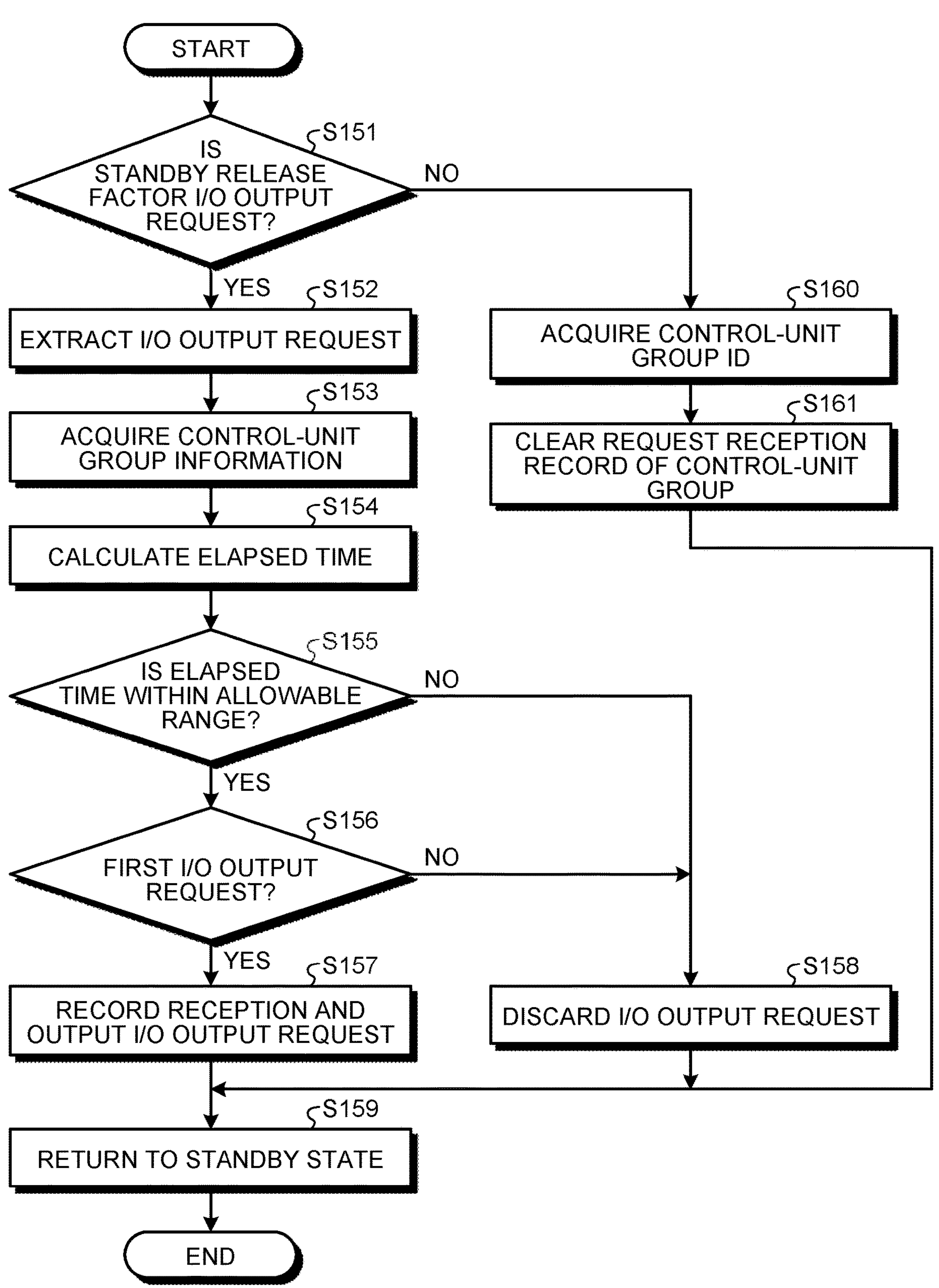
FIG. 8 is a diagram illustrating an example of a procedure of filtering processing according to the second embodiment of the present disclosure.

Moreover, the redundancy-capable filtering unit 18 in the drawing is switched from a stand-by state to execution triggered by two events as described later in FIG. 8. The two events are reception of an I/O output request (an YES branch at step S151 in FIG. 8), and a time-out of a fixed-cycle timer that is synchronized with the group request cycle of each control-unit group (a NO branch at step S151 in FIG. 8). A reason why the request reception record of a main cycle is cleared at the time of time-out at step S161 in FIG. 8 is to determine that an I/O output request received after the time-out is the first request in a next cycle.

To be able to calculate elapsed time from a start of a cycle easily from an output request reception time, the redundancy-capable filtering unit 18 uses, for example, a fixed-cycle timer provided by the operating system (OS), synchronizing with the request cycle of the control unit 31 and the like. In the present embodiment, the fixed-cycle timer and the request cycle of the control unit 31 and a control unit 32 can be set to start at a scheduled time when the second of time is exactly 0. Moreover, for example, a fixed-cycle timer having a different ID may be allocated to each control-unit group so that it is possible to determine that a time-out of the fixed cycle timer is of the group request cycle of which control-unit group.

When one out of the control units 30 and 31 is normal and the other is abnormal (stopped) state, or when one path of the standard network 40 connected to the control units 30 and 31 is disconnected, a I/O output request transmitted in every group request cycle from one of the control units 30 and 31 is output to the abnormality-detecting unit 19.

When both of the control units 30 and 31 are in an abnormal (stopped) state, or when the both paths of the standard network 40 connected to the control units 30 and 31 are disconnected, an I/O output request of each group request cycle is not transmitted from the control units 30 and 31. In this case, an abnormality is detected by the abnormality-detecting unit 19. In this case, similarly to the first embodiment, the abnormality-detecting unit 19 performs alternate I/O output request.

Moreover, the abnormality-detecting unit 19 in the drawing detects an abnormality for each of the control-unit groups. The abnormality-detecting unit 19 is one example of an abnormality detecting unit.

Control-Unit-Group Information

FIGS. 7A to 7C are diagrams illustrating an example of the control-unit-group information according to the second embodiment of the present disclosure. The drawing illustrates three kinds of I/O output information.

FIG. 7A illustrates correspondence between a control unit ID and a control unit group, out of the control-unit-group information. "CONTROL-UNIT GROUP ID" is a number for identifying a control unit group. "CONTROL UNIT ID" is same as "CONTROL UNIT ID" in FIG. 3A. To the control units 30 and 31, the control-unit group ID "1" is assigned. The control-unit group ID "2" corresponds to a control unit in a single configuration.

FIG. 7B is a diagram illustrating a correspondence among an I/O output-device number, an I/O type, an alternate operational output, and a control-unit group ID out of the control-unit-group information. Instead of "CONTROL-UNIT ID" in FIG. 3A, "CONTROL-UNIT GROUP ID" is provided.

FIG. 7C is a diagram illustrating a control-unit group ID, a group request cycle, allowable elapsed time, and request waiting time, out of the control-unit-group information. "ALLOWABLE ELAPSED TIME" in the drawing indicates allowable elapsed time of each control-unit group. "REQUEST WAITING TIME" indicates request waiting time of each control-unit group.

FIG. 8 is a diagram illustrating an example of a procedure of filtering processing according to the second embodiment of the present disclosure. The drawing is a flowchart illustrating an example of a procedure of processing in the redundancy-capable filtering unit 18, similarly to FIG. 4. The processing in the drawing differs from the processing in FIG. 4 in a point that it is triggered by timeout of the fixed-cycle timer of each group request cycle other than an I/O output request. The redundancy-capable filtering unit 18 in FIG. 6 is released from its waiting state (standby state) by two factors, and performs the processing in the drawing.

First, the redundancy-capable filtering unit 18 judges whether a standby release factor is an I/O output request (step S151). As a result, when the standby release factor is an I/O output request (step S151: YES), the redundancy-capable filtering unit 18 extracts the I/O output request (step S152). Next, the redundancy-capable filtering unit 18 acquires the control-unit-group information from the redundancy-capable I/O-output-definition-information storing unit 20 (step S153). Thus, the redundancy-capable filtering unit 18 acquires the control-unit group ID and the group request cycle. Next, the redundancy-capable filtering unit 18 calculates elapsed time (step S154). Subsequently, the redundancy-capable filtering unit 18 judges whether the elapsed time is within an allowable range (step S155).

As a result, when the elapsed time exceeds the allowable range (step S155: NO), the redundancy-capable filtering unit 18 discard the I/O output request (step S158), and proceeds to processing at step S159.

On the other hand, at step S155, when the elapsed time is within the allowable range (step S155: YES), the redundancy-capable filtering unit 18 judges whether it is the first I/O output request in the group request cycle (step S156). Step S157, if a request reception record indicates "received" as described later, it is not the first reception. As a result, when it is not the first I/O output request (step S156: NO), the redundancy-capable filtering unit 18 discard the I/O output request (step S158), and proceeds to processing at step S159.

On the other hand, at step S156, when it is the first I/O output request (step S156: YES), the redundancy-capable filtering unit 18 records "received" in the request reception record, and outputs the I/O output request to the abnormality-detecting unit 19 (step S157), and proceeds to processing at step S159.

At step S151, when the standby release factor is not an I/O output request (step S151: NO), the redundancy-capable filtering unit 18 acquires the control-unit group ID (step S160), and clears the request reception record of the control-unit group (step S161).

At step S159, the redundancy-capable filtering unit 18 stops the processing, and returns to the standby state (step S159). By the processing explained above, the filtering processing can be performed.

When an I/O output request is received after the allowable elapsed time of the group request cycle has passed, the redundancy-capable filtering unit 18 determines that the I/O output request is abnormal, and discards it. The allowable elapsed time can be set to, for example, ½ of the group request cycle. Specifically, as illustrated in FIG. 7C, when the group request cycle is 500 ms, the allowable elapsed time can be set to 250 ms. Because the group request cycle is 500 ms in the present embodiment, the elapsed time in the group request cycle can be calculated as a remainder when fractions smaller than 1000 ms in a reception time is divided by the group request cycle. For example, when the reception time is 9:17:32.700, it is calculated as 700/500=1, and the remainder is 200. This 200 can be calculated as the elapsed time.

The second filtering of the redundancy-capable filtering unit 18 is not limited to this example. For example, the redundancy-capable filtering unit 18 can wait until I/O output requests of the control units 30 and 31 are both available, and when the two I/O output requests match, processing of outputting the I/O output request to the abnormality-detecting unit 19 can be performed as the second filtering. In this case, when the two I/O output requests do not match, the I/O output requests are discarded.

Another Configuration of Control System

Figure 9:
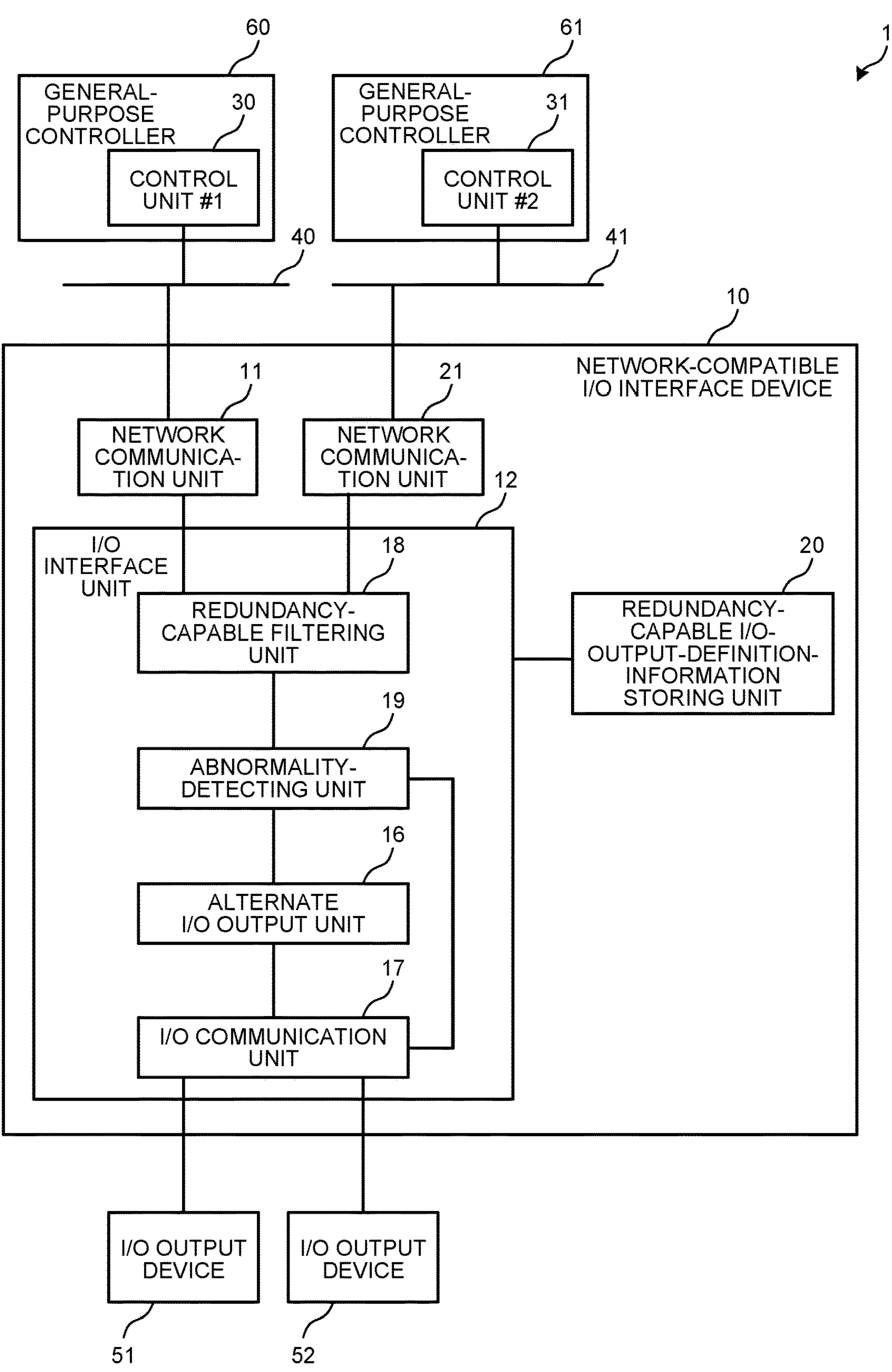
FIG. 9 is a diagram illustrating another configuration example of the control system according to the second embodiment of the present disclosure.

FIG. 9 is a diagram illustrating another configuration example of the control system according to the second embodiment of the present disclosure. The drawing is a block diagram illustrating a configuration example of the control system 1, similarly to FIG. 6. The control system 1 in the drawing differs from the control system 1 in FIG. 6 in a point that the control units 30 and 31 are connected to standard networks different from each other.

The control unit 30 is connected to the network-compatible I/O interface device 10 through the standard network 40. Moreover, the control unit 31 is connected to the network-compatible I/O interface device 10 through a standard network 41. Furthermore, the network-compatible I/O interface device 10 in the drawing further includes a network communication unit 21 to communicate with the standard network 41, unlike the second embodiment in FIG. 6. Thus, two independent network path can be secured.

As explained above, the control system 1 operates the control units 30 and 31 included in the same control-unit group in synchronization. Moreover, the network-compatible I/O interface device 10 processes I/O output requests collectively for each control-unit group. Therefore, also in a case in which two control units (control units 30 and 31) that control the I/O output device 51 and the like in synchronization are provided, control of the I/O output device 51 and the like is possible. Moreover, also when either one of two control units (control units 30 and 31) breaks down, or also when communication of either one of the control units is disconnected because of a malfunction of the standard networks 40 and 41, control of the I/O output device 51 and the like can be continued by the other control unit.

The configuration of the control system 1 other than this part is same as the configuration of the control system 1 in the first embodiment and, therefore, explanation thereof is omitted.

As described, the control system 1 of the second embodiment of the present disclosure have two control units (control units 30 and 31), and by transmitting an I/O output request to the I/O output device 51 and the like through the network-compatible I/O interface device 10, the control unit can be duplicated. Redundancy can be provided to the control system 1, and the reliability can be improved.

4. Third Embodiment

Figure 10:
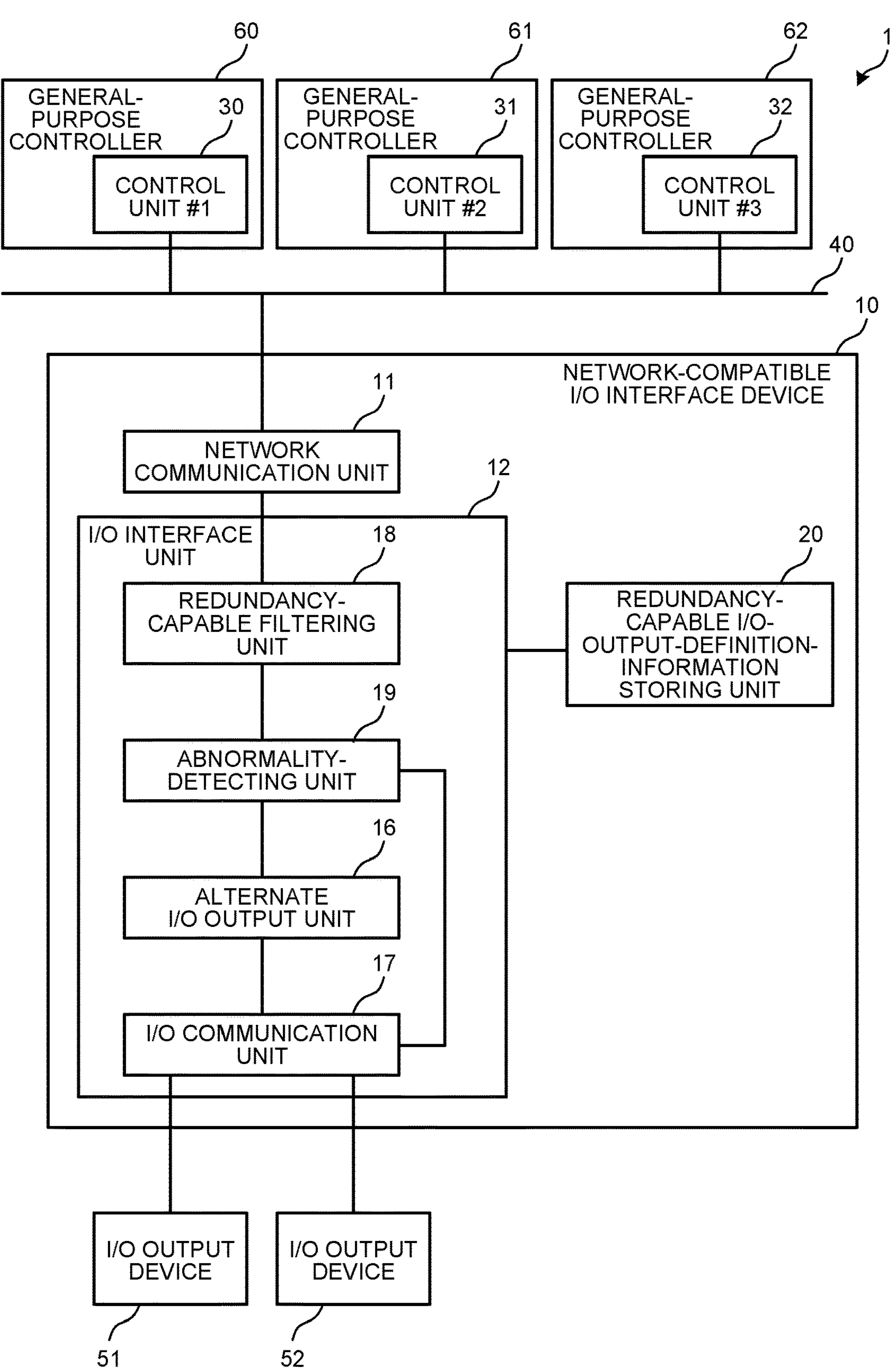
FIG. 10 is a diagram illustrating a configuration example of a control system according to a third embodiment of the present disclosure.

The control system 1 of the second embodiment described above have two control units. On the other hand, the control system 1 according to a third embodiment of the present disclosure differs from the second embodiment in a point that three control units are included. Configuration of Control System FIG. 10 is a diagram illustrating a configuration example of a control system according to a third embodiment of the present disclosure. The drawing is a block diagram illustrating a configuration example of the control system 1, similarly to FIG. 6. The network-compatible I/O interface device 10 in the drawing differs from the network-compatible I/O interface device 10 in FIG. 6 in a point that it is further connected to a control unit 32.

The control units 30, 31, and 32 are control units that are included in the same control-unit group. That is, the control units 30, 31, and 32 operate in synchronization.

The redundancy-capable filtering unit 18 performs filtering with respect to an I/O output request from the control units 30, 31, and 32. The redundancy-capable filtering unit 18 in the drawing can perform filtering in which an I/O output request is selected based on majority decision with respect to I/O output requests from plural control units (control units 30, 31, and 32) as the second filtering. Specifically, when two I/O output requests out of I/O output requests from the control units 30, 31, and 32 match, the relevant I/O output request can be selected. In this case, when all of the I/O output requests from the control units 30, 31, and 32 are different, all of the I/O output requests are discarded. In this case, similarly to the first embodiment, the abnormality-detecting unit 19 performs alternate I/O output request.

The configuration other than this part is same as the configuration of the control system 1 in the second embodiment and, therefore, explanation thereof is omitted.

As described, the control system 1 of the third embodiment of the present disclosure can further improve the redundancy by having the three control units 30, 31, and 32.

5. Fourth Embodiment

The control system 1 of the third embodiment have the three control units. On the other hand, the control system 1 of a fourth embodiment of the present disclosure differs from the third embodiment described above in a point that it includes n (n is a positive integer equal to or larger than 4) units of control units.

Configuration of Control System

Figure 11:
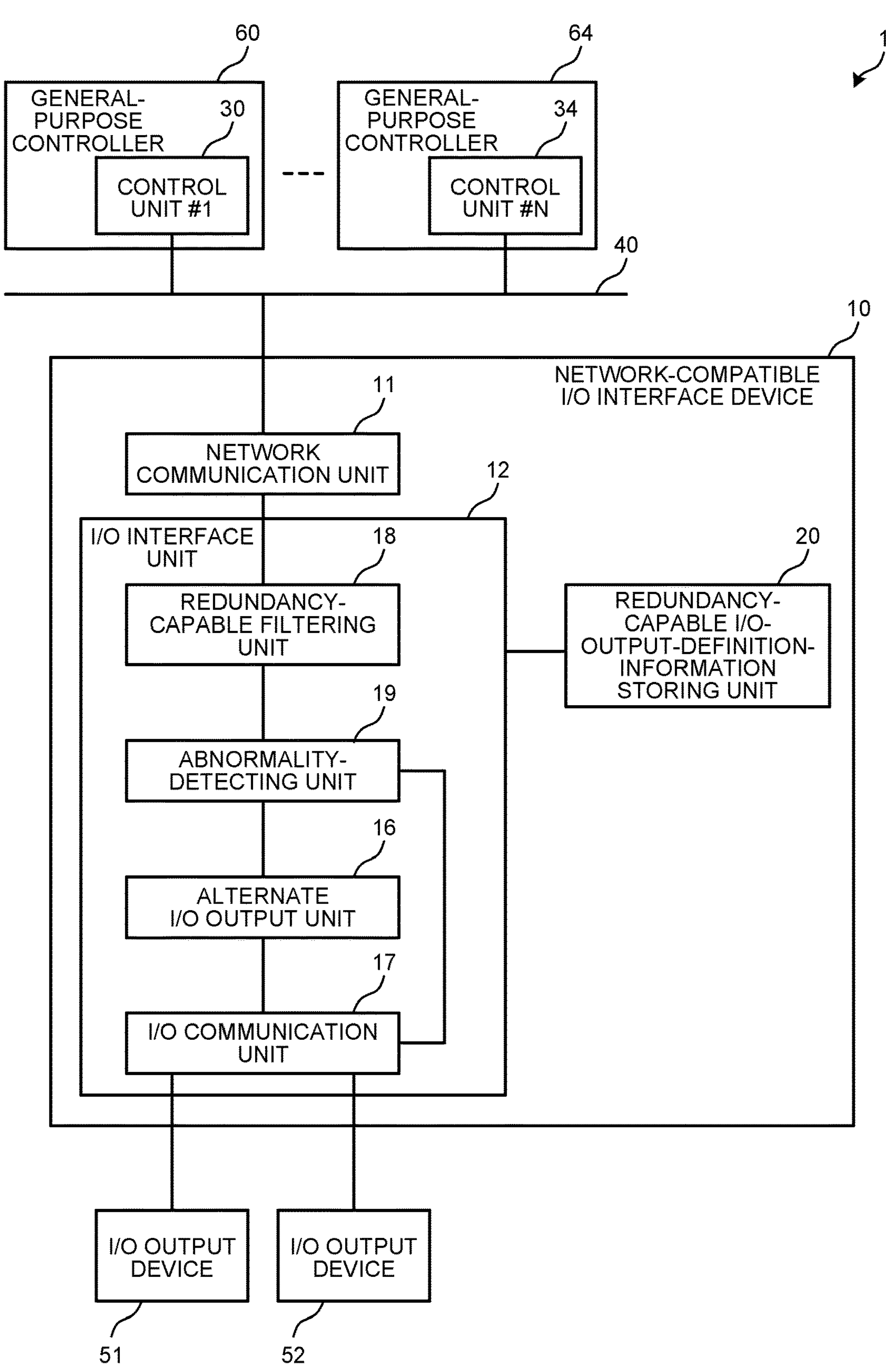
FIG. 11 is a diagram illustrating a configuration example of a control system according to a fourth embodiment of the present disclosure.

FIG. 11 is a diagram illustrating a configuration example of a control system according to a fourth embodiment of the present disclosure. The drawing is a block diagram illustrating a configuration example of the control system 1, similarly to FIG. 10. The network-compatible I/O interface device 10 in the drawing differs from the control system 1 in FIG. 10 in a point that it includes n units of control units (control units 30 to 34).

The control units 30 to 34 in the drawing are control units included in the same control-unit group. That is, the control units 30 to 34 operate in synchronization.

The redundancy-capable filtering unit 18 in the drawing performs filtering with respect to an I/O output request from the control units 30 to 34. The redundancy-capable filtering unit 18 in the drawing can perform processing of outputting an I/O output request to the abnormality-detecting unit 19 as the second filtering when two I/O output requests out of the I/O output requests from the control units 30 to 34 match. In this case, when all of the I/O output requests from the control units 30 to 34 are different, all of the I/O output requests are discarded. In this case, the abnormality-detecting unit 19 outputs an alternate I/O output request.

Moreover, the redundancy-capable filtering unit 18 can perform filtering in which an I/O output request is selected based on majority decision with respect to I/O output requests from plural control units (control units 30 to 34) as the second filtering.

The configuration of the control system 1 other than this point is same as the control system 1 in the third embodiment of the present disclosure and, therefore, explanation thereof is omitted.

As described, the control system 1 of the fourth embodiment of the present disclosure can further improve the redundancy by having n units of the control units 30 to 34.

6. Fifth Embodiment

Figure 12:
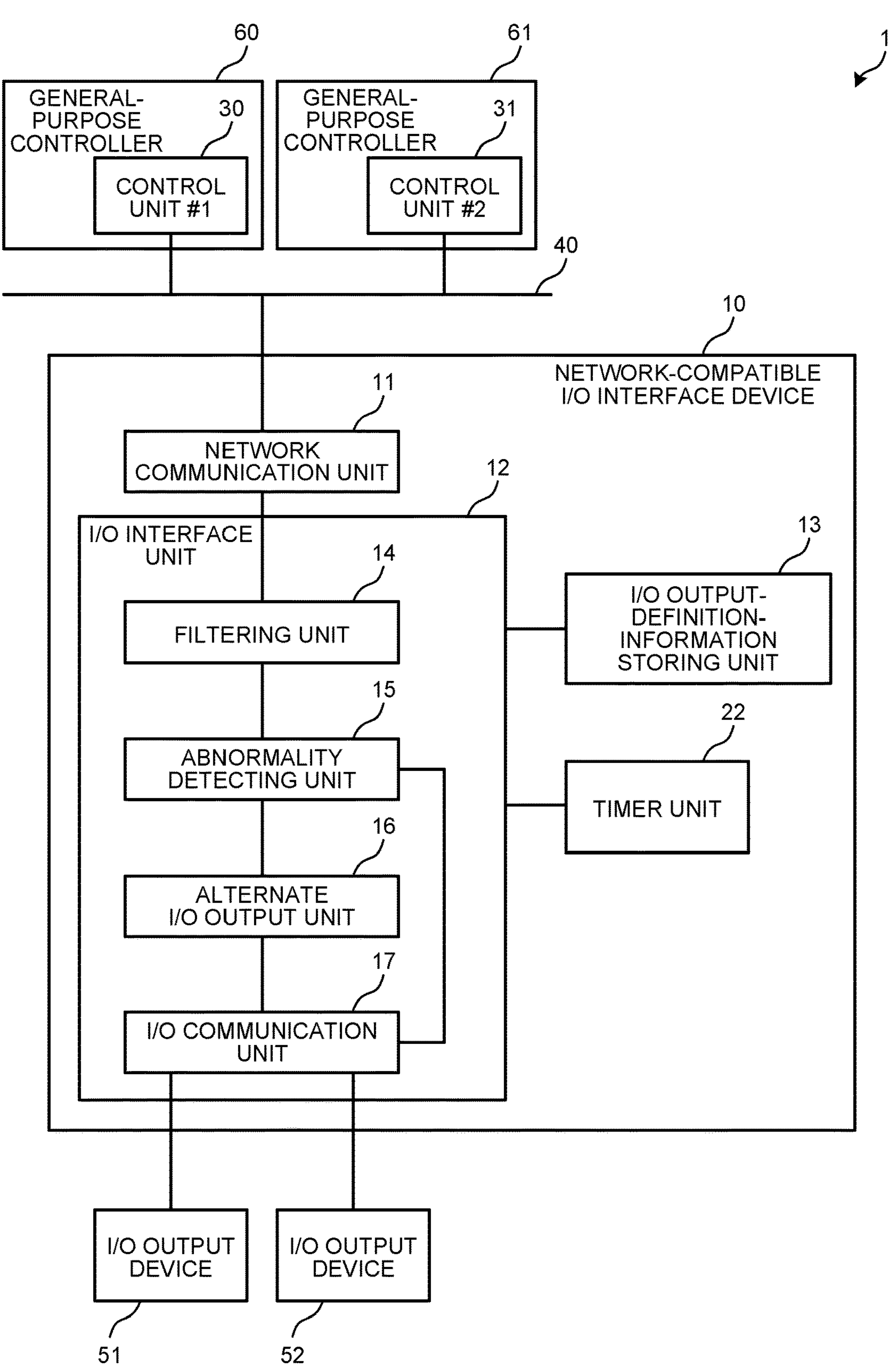
FIG. 12 is a diagram illustrating a configuration example of a control system according to a fifth embodiment of the present disclosure.

FIG. 12 is a diagram illustrating a configuration example of a control system according to a fifth embodiment of the present disclosure. The drawing is a block diagram illustrating a configuration example of the control system 1, similarly to FIG. 2. The network-compatible I/O interface device 10 in the drawing differs from the control system 1 in FIG. 2 in a point that it includes a timer unit 22.

The timer unit 22 is to measure the request waiting time described above. This timer unit 22 can measure the request waiting time for each of the control units 30. For example, the timer unit 22 can adopt a configuration in which each of the control units 30 has a timer. Moreover, the timer unit 22 outputs elapsed time to the abnormality detecting unit 15 as information of the timer.

Furthermore, the timer unit 22 may have a time synchronization function. This time synchronization function is a function of controlling time synchronization in the network environment described above. As described previously, the general-purpose controllers 60 and 61 and the network-compatible I/O interface device 10 exchange an I/O output request in each group request cycle. Absolute times in the plural general-purpose controller 60 and the like and the network-compatible I/O interface device 10 are synchronized by the time synchronization function. Thus, it is possible to cause fixed time timers and fixed cycle timers of the respective devices to time out substantially simultaneously. Accordingly, the plural control units 30 and the like in the same control-unit group can perform the respective processing of a control cycle substantially simultaneously. Moreover, because the elapsed time in a group request cycle can be measured in synchronization between the control unit 30 and the like and the I/O interface unit 12, it is possible to exclude an I/O output request after the allowable elapsed time as an abnormality. Time synchronization can be performed, for example, by simple network time protocol (SNTP) that implements network time protocol (NTP).

The configuration of the control system 1 other than this part is same as the control system 1 in the first embodiment and, therefore, explanation thereof is omitted.

The effects described in the present application are only illustrative, and it is not limited thereto, and other effects may be produced.

Some examples of combinations of disclosed technical features will be listed below.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device comprising:

a processor that receives an I/O output request including an operational output for an I/O output device to operate a plant, the I/O output request transmitted from a plurality of controllers through a network;

the processor that performs filtering in which an I/O output request from a proper controller out of the received I/O output requests is selected and output;

the processor that detects an abnormality of the I/O output request; and the processor that transmits, when the abnormality is detected, an alternate I/O output request, which is a request including an alternate operational output, to an I/O output device corresponding to the I/O output request, and that outputs, when the abnormality is not detected, the I/O output request output from the processor to an I/O output device corresponding to the I/O output request, wherein the processor performs the filtering for each of control-unit group including the controllers that transmit the I/O output requests to an identical I/O output device, the controllers included in the control-unit group output the I/O output request in synchronization with a group request cycle that is a cycle in which the I/O output request is transmitted, the processor further performs a second filtering in which the I/O output request is selected based on the group request cycle and is output, and the processor performs filtering in which the I/O output request that includes the operational output based on majority decision is selected and is output as the second filtering, when a different operational output is included in the I/O output requests received in the group request cycle.

2. The device according to claim 1, wherein the processor detects an abnormality when the processor does not receive the I/O output request from the controller during a predetermined period.

3. The device according to claim 1, wherein the processor performs filtering in which a first I/O output request is selected out of the I/O output requests including the same operational output received in the group request cycle and is output, as the second filtering.

4. The device according to claim 1, wherein the processor performs filtering in which a received I/O output request is output as the second filtering, when the operational output is identical in the I/O output requests received in the group request cycle.

5. The device according to claim 1, wherein the processor performs the second filtering in which the received I/O output request is not selected when the operational output is different from one another in the I/O output requests received in the group request cycle.

6. A system comprising:

a plurality of controllers that transmit an I/O output request that is a request including an operational output for an I/O output device to operate a plant;

a processor that receives the I/O output request through a network;

the processor that performs filtering in which an I/O output request from a proper controller out of the received I/O output requests is selected and output;

the processor that detects an abnormality of the I/O output request; and the processor that transmits, when the abnormality is detected, an alternate I/O output request, which is a request including an alternate operational output, to an I/O output device corresponding to the I/O output request, and that outputs, when the abnormality is not detected, the I/O output request output from the processor to an I/O output device corresponding to the I/O output request, wherein the processor performs the filtering for each of control-unit group including the controllers that transmit the I/O output requests to an identical I/O output device, the controllers included in the control-unit group output the I/O output request in synchronization with a group request cycle that is a cycle in which the I/O output request is transmitted, the processor further performs a second filtering in which the I/O output request is selected based on the group request cycle and is output, and the processor performs filtering in which the I/O output request that includes the operational output based on majority decision is selected and is output as the second filtering, when a different operational output is included in the I/O output requests received in the group request cycle.

7. A method comprising:

receiving an I/O output request including an operational output for an I/O output device to operate a plant, the I/O output request transmitted from a plurality of controllers through a network;

performing filtering in which an I/O output request from a proper controller out of the received I/O output requests is selected and output;

detecting an abnormality of the I/O output request; and transmitting, when the abnormality is detected, an alternate I/O output request, which is a request including an alternate operational output, to an I/O output device corresponding to the I/O output request; and outputting, when the abnormality is not detected, the I/O output request subjected to the filtering to an I/O output device corresponding to the I/O output request, wherein the method performs the filtering for each of control-unit group including the controllers that transmit the I/O output requests to an identical I/O output device, the controllers included in the control-unit group output the I/O output request in synchronization with a group request cycle that is a cycle in which the I/O output request is transmitted, the method further performs a second filtering in which the I/O output request is selected based on the group request cycle and is output, and the method performs filtering in which the I/O output request that includes the operational output based on majority decision is selected and is output as the second filtering, when a different operational output is included in the I/O output requests received in the group request cycle.

* * * * *